US011364476B2

(12) United States Patent
Cooner

(10) Patent No.: US 11,364,476 B2
(45) Date of Patent: *Jun. 21, 2022

(54) AIRBORNE DUST ABATEMENT DEVICE

(71) Applicant: Charles C. Cooner, Janesville, WI (US)

(72) Inventor: Charles C. Cooner, Janesville, WI (US)

( * ) Notice: Subject to any disclaimer, the term of this patent is extended or adjusted under 35 U.S.C. 154(b) by 182 days.

This patent is subject to a terminal disclaimer.

(21) Appl. No.: 16/591,338

(22) Filed: Oct. 2, 2019

(65) Prior Publication Data

US 2020/0222868 A1    Jul. 16, 2020

Related U.S. Application Data

(63) Continuation-in-part of application No. 16/244,264, filed on Jan. 10, 2019.

(51) Int. Cl.

| B01F 15/00 | (2006.01) |
| B01D 46/00 | (2022.01) |
| B01F 3/12 | (2006.01) |
| B01F 35/00 | (2022.01) |
| B01F 23/50 | (2022.01) |
| B01F 101/28 | (2022.01) |

(52) U.S. Cl.
CPC ........ B01F 35/184 (2022.01); B01D 46/0041 (2013.01); B01F 23/59 (2022.01); B01F 35/186 (2022.01); B01F 35/187 (2022.01); B01D 2279/35 (2013.01); B01F 2101/28 (2022.01)

(58) Field of Classification Search
CPC .......... B01F 15/00961; B01F 15/00967; B01F 15/00974; B01F 15/00993; B01F 2215/0047; B01F 35/184; B01F 35/186; B08B 15/04; B08B 15/007; B01D 46/0041; E03D 9/052
USPC ......................................................... 366/347
See application file for complete search history.

(56) References Cited

U.S. PATENT DOCUMENTS 3,673,744 A    7/1972   Oimoen
4,071,338 A *  1/1978   Hutter, III ............. B08B 15/007
                                                          96/139
(Continued)

OTHER PUBLICATIONS

Contractors Direct website printout showing Beaton Innovations, LLC's WaleTale Dust Containment Vacuum Attachment sold since at least as early as 2017.

*Primary Examiner* — Elizabeth Insler
(74) *Attorney, Agent, or Firm* — Jeffrey S. Sokol

(57) ABSTRACT

The present invention is a dust abatement device that secures over a container. Powdery material, such as plaster, cement, grout or the like, is poured through the device, and mixed with water inside the container. The device has a mounting sleeve and radial manifold. The manifold forms a radial pneumatic channel with a circumferentially disbursed air intake that generates a radially uniform airflow to draw in airborne dust that would otherwise escape to the surrounding air. The manifold is connected to a vacuum with an air filter, and generates a dust shield zone above and around the device, which only extends down from the manifold a few inches. The manifold also funnels material and water into the container, and forms an inner eave that spaces material and water from the air intake, and forms a splash guard to retain upwardly projected splashes of material and water inside the container.

29 Claims, 10 Drawing Sheets

(56) References Cited

U.S. PATENT DOCUMENTS

| | | |
|---|---|---|
| 4,621,462 A | 11/1986 | Hinshaw |
| 4,780,143 A | 10/1988 | Roe |
| 5,411,433 A | 5/1995 | Keller |
| 5,414,892 A | 5/1995 | Clark, Jr. |
| 7,297,188 B2 | 11/2007 | Nielsen |
| 8,348,726 B2 | 1/2013 | Brunner |
| 9,168,624 B2 | 10/2015 | Hahn |
| 9,296,079 B2 | 3/2016 | Miwa |
| 9,656,361 B2 | 5/2017 | Appel |
| 9,821,389 B2 | 11/2017 | Buser |
| 10,016,868 B2 | 7/2018 | Sheldon |

\* cited by examiner

AIRBORNE DUST ABATEMENT DEVICE

TECHNICAL FIELD OF THE INVENTION

This invention relates to an airborne dust abatement device that fits over a container, allows a powdery material and water to pour through it and into the container, forms a radial manifold with a circumferentially disbursed air intake to draw in airborne dust, allows dust below the air intake to settle inside the container, forms a radial baffle to retain splashes of material and water during mixing, increases the effective diameter of the container, and funnels material and water into the container.

BACKGROUND OF THE INVENTION

A variety of building construction materials are sold in powder or granular form for mixing with water prior to use. Plaster, grout, cement and drywall joint compound are examples of these products. Once mixed, the material is quickly applied before it begins to cure. The products are mixed at the job site, which is often inside a house or building. Pouring these products into a mixing pail and mixing them with water is messy and generates dust that propagates into the surrounding air. Pouring the material generates airborne and heavier dust above the mixing pail, as well as airborne dust that rises out of pail. Mixing the powdery material with water generates additional airborne dust that rises out of the pail. Water and powdery material also splash out of the pail and onto the worker, their clothing and the floor. Dust and residue that accumulates inside a building is blown or kicked back up into the air by other construction activities. Workers breathe the dust, which irritates their respiratory systems. The long term effects of regularly inhaling this dust include occupational asthma and chronic obstructive pulmonary disease. The term "airborne dust" refers to the fine particles of material (e.g., particles less than about 50 to 100 microns released from the main flow of material) generated during the pouring or mixing of a plaster, grout, cement, drywall joint compound, etc., that are capable of being carried by or through the air. The term "heavier dust" refers to particles of material (e.g., particles greater than about 50 to 100 microns released from the main flow of material) that settle out of the air more quickly than aerodynamically lighter airborne dust, which remains persistently airborne for longer periods of time.

Minimizing the proliferation of dust and splashes of material and water while meeting the rigors of construction is challenging. The pouring and mixing steps are typically done as quickly as possible, which invariably produces dust and splashes, particularly when power mixing tools are used. While masks should be worn, their use is inconvenient and often ignored. Workers frequently fail to take the time to locate and put on a mask, particularly when they are wearing gloves and a hat. Cleaning the area around the mixing pail is also inconvenient and often ignored. Workers walk through, sit in or brush against residue, and track or carry it throughout the building.

Conventional products are used to reduce dust when pouring and mixing a powdery material. One such product is sold by Beaton Innovations as the WALE TALE vacuum attachment. These conventional products suffer from a variety of problems. For example, the vacuum attachment has a suction inlet with a securement slot that attaches to the rim on one side of the mixing pail. The attachment draws air and dust directly toward that side of the pail. The suction inlet is located at and inward of the pail rim. This arrangement suffers from several problems. While dust closer to the attachment side of the pail may be captured, dust on the opposite side of the pail more readily escapes into the surrounding air. Turning up the vacuum suction and airflow only accentuates the other following problems.

Vacuum attachments needlessly consume the powdery material. First, mixing pails are relatively narrow in diameter, and powdery materials spreads out when being poured through the air. Large amounts of material are consumed when material is poured along a flow path passing near the intake of the attachment. Directing the pour away from the attachment results in some of the powdery flow missing the pail. Any slip or inattention by a worker pouring a heavy bag of powdery material sends a large quantity of powdery material to the vacuum or onto the floor. Second, not all of the dust generated during pouring and mixing the powdery material needs to be filtered by the vacuum. A significant amount of dust remains inside the mixing pail, and if allowed, will settle onto the surface of the mixture being prepared. Yet, conventional vacuum attachments draw in dust and material from deep inside the pail. Third, conventional vacuum attachments produce airflow patterns that disturb the surface of the mixture inside the pail, particularly when larger batches are being prepared. This surface disturbance generates additional dust. The vacuum attachment then consumes that additional, self-generated dust. Fourth, water can be inadvertently poured into the intake vent of the vacuum attachment, particularly when a worker is tired, rushed, distracted or not properly trained. The resulting water and material mixture inside the vacuum cures and clogs the vacuum and its air filter. Fifth, the vacuum attachment has a relatively wide, and exposed suction intake that consumes splashes of material and water during mixing. Again, this material and water mixture clogs the vacuum and its air filter. The needless consumption of material and inadvertent consumption of water results in extra work and down time. Workers have to frequently open and clean the interior of the vacuum and its air filter, particularly when water is consumed.

Conventional dust reduction products do not prevent splashes of material and water from escaping the pail during the mixing process. Power tools equipped with mixing paddles propel splashes out of the pail, which creates a significant mess, particularly when larger batches come close to filling the pail.

Conventional dust reduction products do not facilitate pouring a powdery material into a mixing pail. Mixing pails have a relatively small diameter. Workers have to pick up and manipulate a heavy container or bag of powdery material while bending over a mixing pail so the flow of material is close to the top of the pail. Some of the powdery material invariably misses the pail and lands of the floor or their shoes, and is tracked around the building.

The present invention is intended to solve these and other problems.

BRIEF DESCRIPTION OF THE INVENTION

The present invention relates to a dust abatement device that secures over a mixing pail. Powdery material, such as plaster, cement, grout or the like, is poured through the device, and mixed with water inside the pail. The device includes a frustoconical mounting sleeve and a radial manifold with a funnel shaped lid or cover. The sleeve secures the device to the pail, and the radial manifold expands the effective diameter of the pail. The manifold forms a radial pneumatic channel with a circumferentially disbursed air intake that generates a radially uniform airflow to draw in airborne dust that would otherwise escape to the surrounding air. The manifold is connected to a vacuum with an air filter, and generates a dust shield zone inside and above the device, which only extends down from the manifold a few inches. The manifold lid or cover forms a funnel to direct flows of material and water into the pail, a radial guard or eave to space downward flows of material and water from the manifold air intake, and a splash guard to retain upwardly projected splashes of material and water inside the pail.

The present dust abatement device enhances worker safety by capturing airborne dust that would otherwise escape to the surrounding air. The frustoconical sleeve of the mounting base positions the radial manifold above the top rim of the mixing pail. The air intake is circumferentially disbursed around the manifold to form a radial dust shield zone and air intake zone inside and above device. In the preferred embodiment, the disbursed air intake is formed by uniformly spaced suction ports and hooded intake vents. The suction ports and vents also draw in airborne dust above the device. When pouring the powdery material, airborne dust is effectively drawn into the manifold from a height of about one half to one foot above the device. Dust rising up from inside the pail and into the vicinity of the manifold is effectively captured by the suction ports with hooded intake vents, and directed by the radial manifold to the filtered vacuum.

The present device enhances productivity by avoiding unnecessary consumption of powdery material and dust during the pouring and mixing steps. First, the frustoconical sleeve or mounting base extends the height of the mixing pail so that more material and dust is retained. Denser flows of powdery material and heavy dust are allowed to settle inside the mixing pail. Second, the device uniformly draws in airborne dust above and around the circumference of the mixing pail. This circumferentially disbursed radial air intake produces a radially uniform airflow pattern that draws in dust axially and downwardly toward the radial manifold. The device does not draw in material and heavier dust from inside the mixing pail. Powdery material on the surface of the mixture inside the pail is not disturbed and heavier dust inside the pail is allowed to settle. Third, the funnel-shaped lid or cover directs water and material pouring or flowing down into the mixing pail away from its suction ports and hooded intake vents. The manifold lid or cover has arced portions above the vents and flat sloped portions between them. Water and material landing on arced portions are direct to the sides of the intake vents and do not flow directly over the front of the vents. Fourth, the hooded intake vents are bottomless so that heavier material and dust flows and water drop down into the container and are not readily drawn into the suction ports. While the vents draw in lighter airborne dust floating near the manifold air intake level, denser flows of water, material and dust fall by gravity down into the pail instead of entering the suction ports. By reducing the unnecessary and undesired intake of material flows, heavier dust and water into the device, both worker productivity and safety are enhanced.

The present dust abatement device forms a splash guard that prevents splashes of material and water from escaping during the mixing process. In one embodiment, the lower mounting base or sleeve is long enough to increase the effective height of the mixing pail. This reduces the amount of splashes that would otherwise escape over the top rim of the pail, even when a worker is making a large batch of material that fills or comes close to filling the pail. The upper portion of the device also has a radial baffle or splash guard formed by an inwardly extending portion of the lid or cover. Splashes reaching the upper portion of the device are redirected back into the pail. Any splashes landing on the top of the funnel-shaped lid or cover flow back into the container.

The present dust abatement device is quickly installed and removed. The frustoconical sleeve or mounting base is flushly received by and secured to the sidewall of the mixing pail. A vacuum hose is easily connected to its exit port. Powdery material and water are poured through the device and into the mixing pail. The device remains installed on the pail during both the pouring and mixing processes. Mixing paddles are inserted through the device and into the pail. Additional water and material are also readily poured through the device to achieve a desired material consistency. When pouring and mixing are complete, the device is readily lifted off the pail and placed aside for further use. The device is easily cleaned by spraying water over its surfaces. The manifold lid or cover is easily removed to expose and clean its internal channel, suction ports, intake vents and exit nozzle. There are no electrical components to short or moving parts to clog or jam.

The present dust abatement device prevents spills of powdery material during the pouring process. The funnel-shaped lid or cover extends outwardly from the generally vertical sidewall of the mixing pail to give a worker a larger effective area into which to pour the powdery material and water. The inwardly and downwardly sloped lid or cover directs the powdery material and water into the mixing pail. Any powdery material remaining on the lid or cover is readily brushed into the container.

The present dust shield device accommodates a variety of mixing containers. The tapered nature of the frustoconical base is received by containers with varying diameters. The device fits five and seven gallon containers. This versatility helps ensure that workers can mix the right amount of material for the particular job at hand.

Other aspects and advantages of the invention will become apparent upon making reference to the specification, claims and drawings.

DESCRIPTION OF THE PREFERRED EMBODIMENT

Figure 1A:
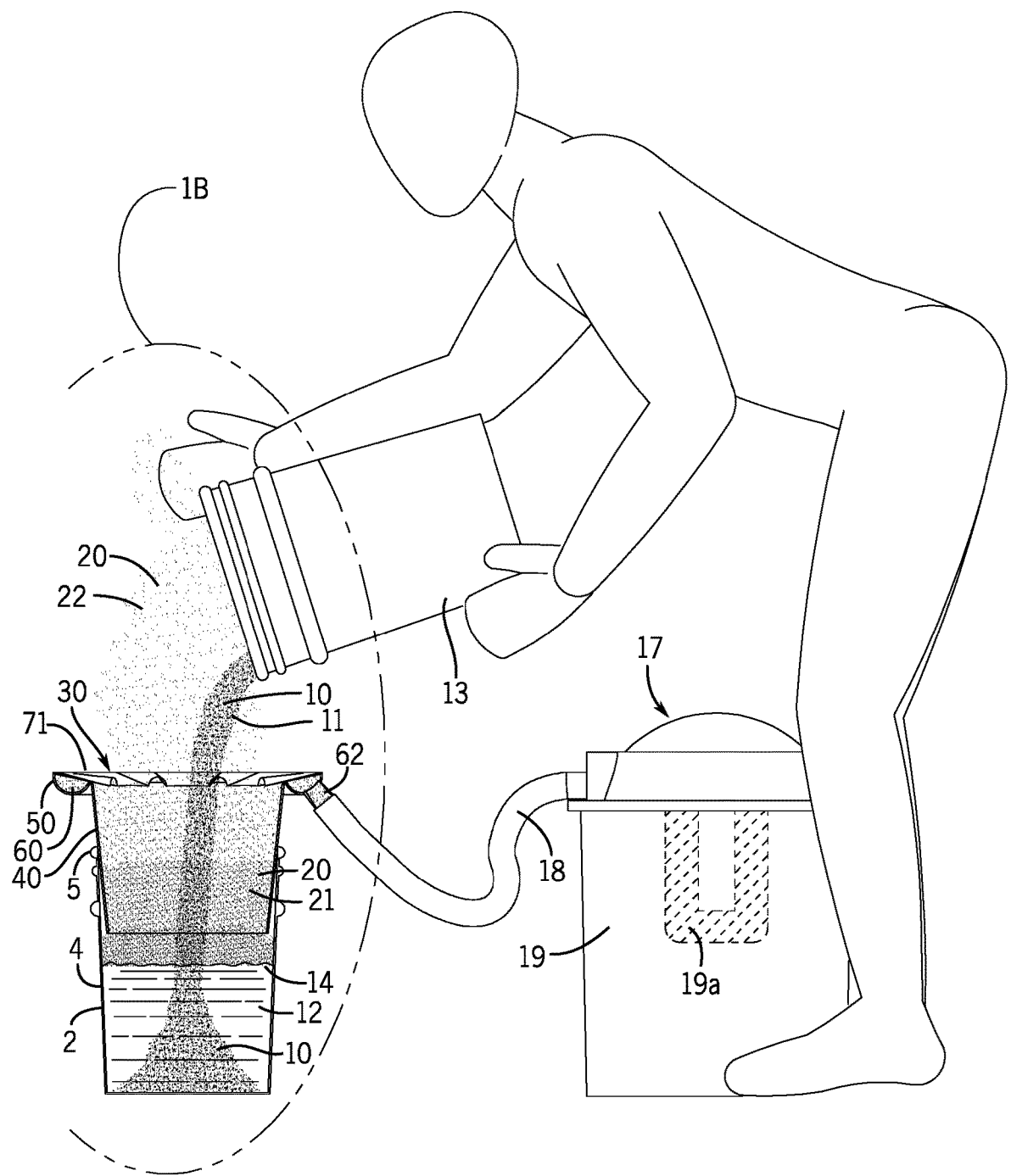
FIG. 1A is a perspective view of a first embodiment of the dust abatement and splash guard device installed on a mixing pail partially filled with water and a worker pouring a powdery material through the central opening of the device and into the pail, with the device capturing the dust generated by the process of pouring the powdery material through the air and into the pail.

While this invention is susceptible to embodiment in many different forms, the drawings show and the specification describes in detail two preferred embodiments of the invention. It should be understood that the drawings and specification are to be considered an exemplification of the principles of the invention. They are not intended to limit the broad aspects of the invention to the embodiments illustrated.

The present invention pertains to a dust abatement and splash guard device placed on a conventional mixing pail or container 2 to facilitate the pouring and mixing of a powdery material 10 and water 12 inside the pail to form a construction material, such as plaster, grout, cement or dry wall joint compound. The cylindrical mixing container or pail 2 has a flat bottom 3, tubular sidewall 4, circular rim 5 defining its open top end, smooth inside surface 6, open interior or compartment 8 and central axis 9. The sidewall 4 is cylindrical and generally normal to the bottom 3, but can be slightly tapered and narrower at the bottom for stacking purposes. The container 2 is typically a conventional five to seven gallon pail made of high density polyethylene (HDPE) with a height of about 14 to 21 inches, top inside diameter of about 10.5 to 12.75 inches, and wall thickness of about ⅛ inch. The outside surface can include one or more outwardly extending gripping ribs or container sealing rib near the top rim 5. The bottom 3 of the pail 3 lays flat on a generally horizontal supporting surface during use. While the preferred embodiment of the container is shown and described as a conventional mixing pail 2, it should be understood that the broad aspects of the invention apply to containers with different shapes, sizes and materials into which a powdery material 10 is dispensed or mixed, where the container has an open upper end and an internal compartment that is otherwise enclosed by the container.

The powdery material 10 is poured from its package 13 into the pail 2 and mixed with a liquid solvent 12 such as water. Desired proportions of material 10 and water 12 are poured into the pail 2 until their surface level 14 reaches a desired height. Mixing is typically done with a conventional power tool 15, particularly for larger construction jobs, but can be done by hand. The power tool 15 is commonly a 5 to 10 amp power hand drill equipped with mixing paddles 16. Suction generating equipment 17 is used to create a lower than atmospheric pressure condition or vacuum that draws in unwanted dust 20 that would otherwise escape to the surrounding air. The vacuum equipment 17 is preferably a conventional 8 to 12 amp, 50 to 250 cfm, wet-dry vacuum with a standard 2.5 inch diameter suction hose 18 and 5 to 20 gallon bucket 19 with an internal filter 19a. The hose 18 has a cross-sectional area of about five square inches.

Figure 1B:
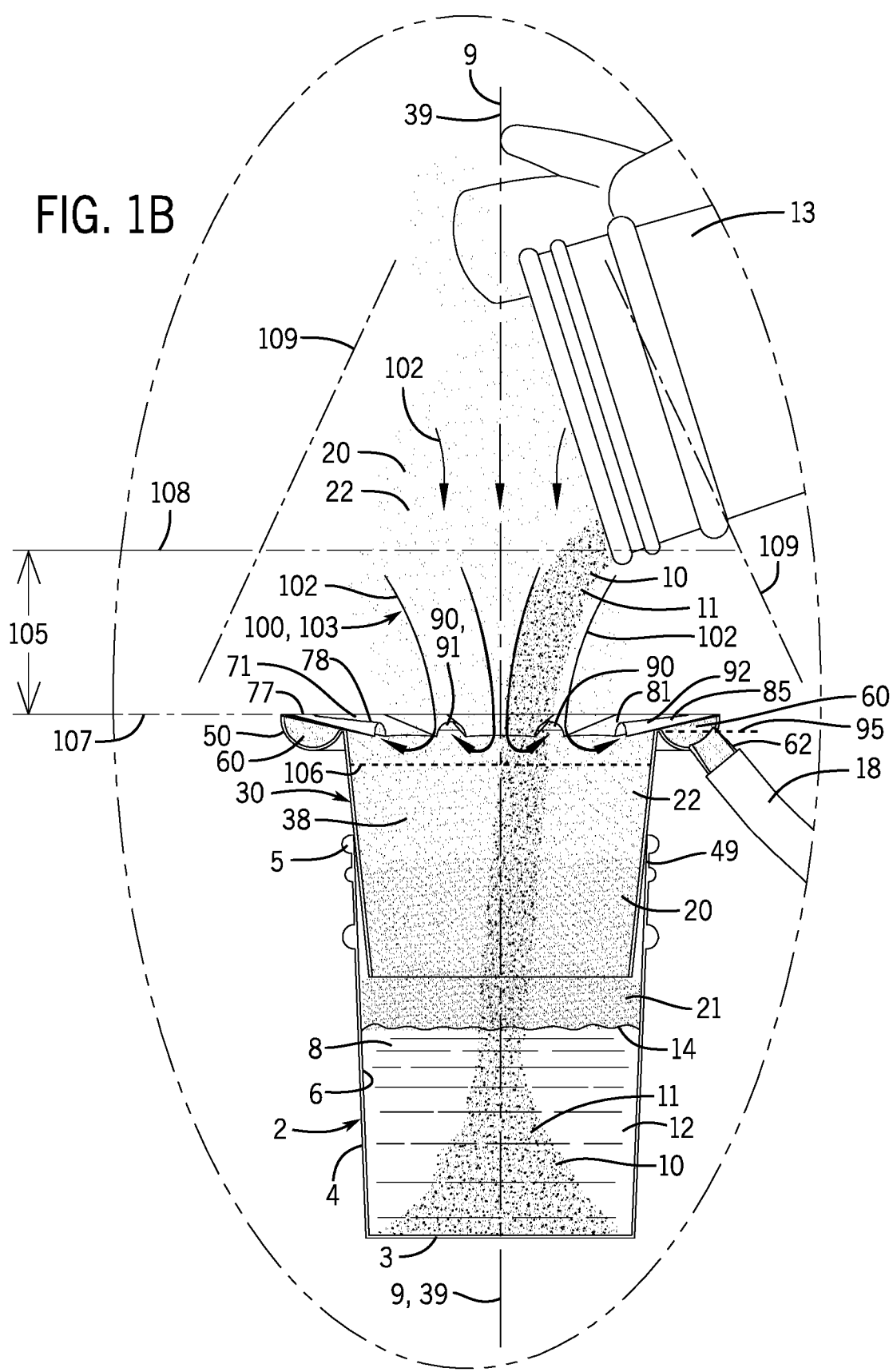
FIG. 1B is a side sectional view of the first embodiment showing the device capturing airborne dust entering or generated in a dust shield zone within and above the device, particularly the dust below the upper level of the dust shield zone.
Figure 5:
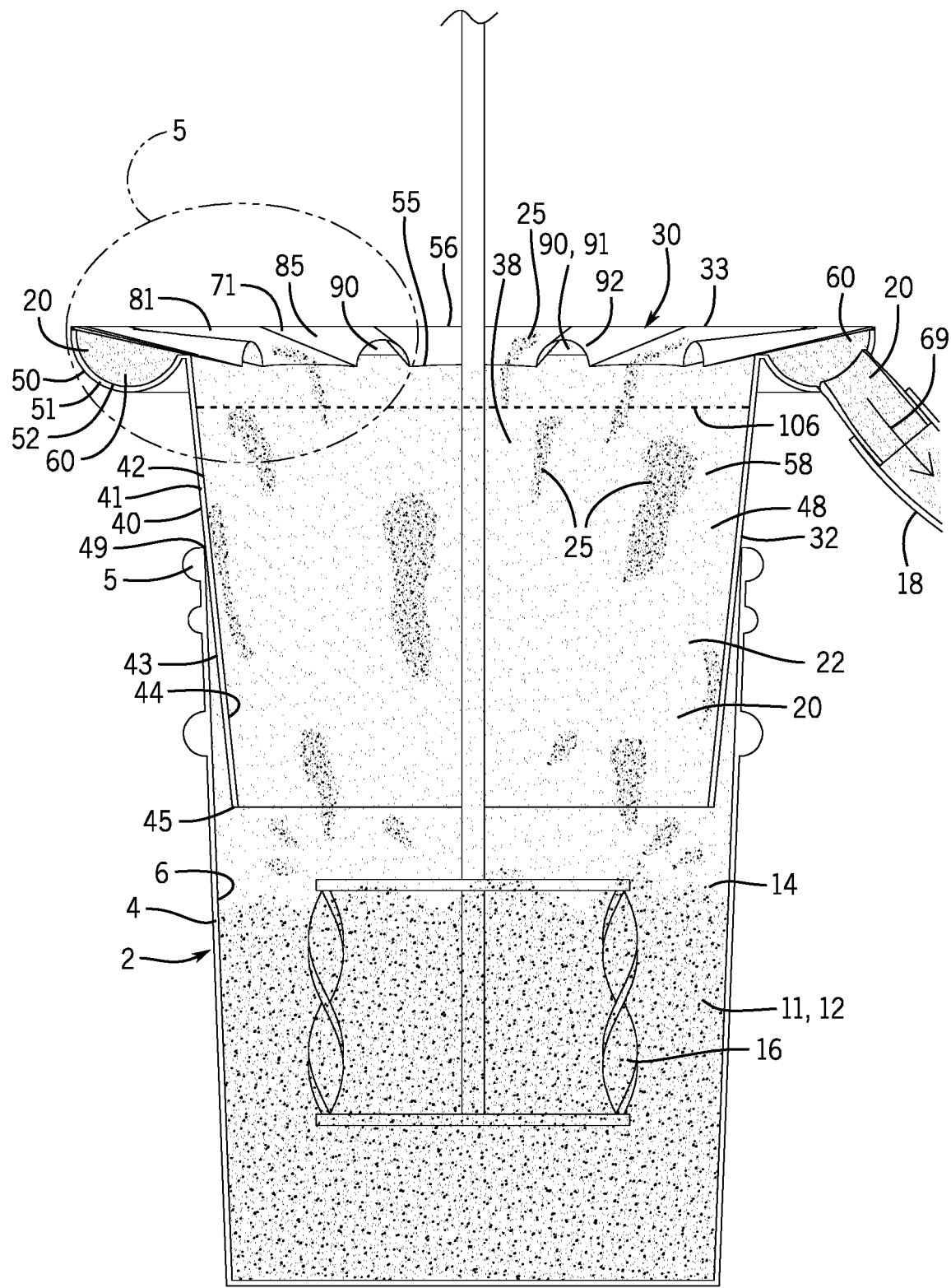
FIG. 5 is a side sectional view of the first embodiment of the device placed on a mixing pail containing powdery material and water, with rotating mixing paddles generating dust that is vented to the vacuum, and showing splashes of material and water that that fly around inside the container and strike or land on the radial baffle or lid of the device and are redirected back into the pail.
Figure 9:
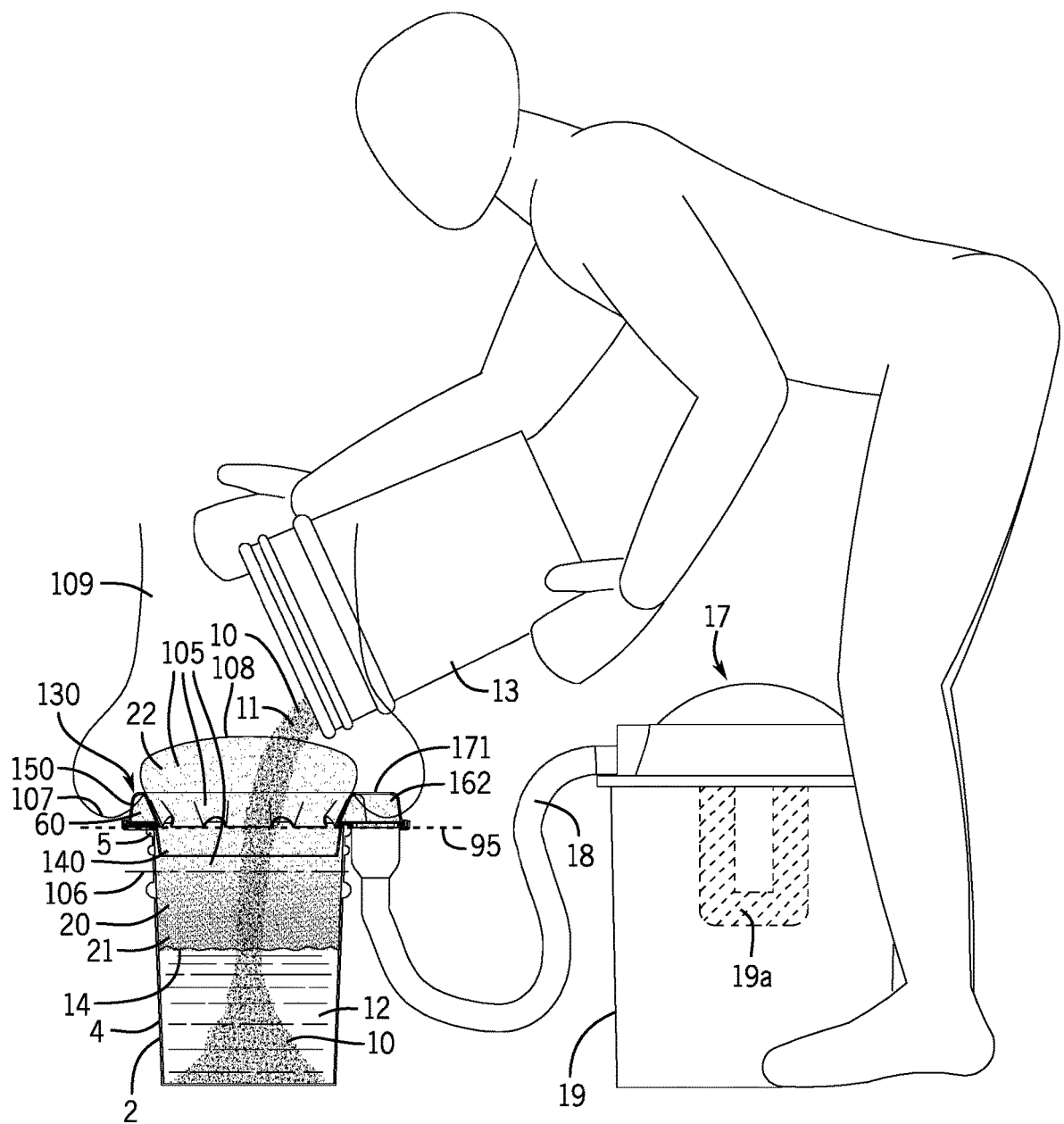
FIG. 9 is a side sectional view of the second embodiment showing the device capturing airborne dust entering or generated in a dust abatement zone above the device, particularly below the upper level of the dust shield zone.

Pouring the powdery material 10 generates dust 20 as shown in FIGS. 1A, 1B and 9. Dust 20 is generated as the powdery material 10 flows 11 out of its shipping package 13 and through the air. The powdery flow of material 11 is thicker or denser near its center and tends to thin or lighten as it spreads out axially from that center. Dust 20 is also generated as the flow 11 of material 10 strikes the bottom 3 of the mixing pail 2 or surface 14 of the mixture inside the pail. Thicker and heavier dust 21 (e.g., particles greater than about 50 to 100 microns released from the main flow of material 11) tends to remain below the top rim 5 of the pail 2, and, if allowed, eventually settles down onto the mixture surface 14. When the present device is not used, unwanted airborne dust 22 (e.g., particles less than about 50 to 100 microns released from the main flow of material 11) is generated above the pail 2 or floats up into the surrounding air above the pail 2. This unwanted airborne dust 22 is less dense or aerodynamically lighter than the more compact main flow of material 11 and heavier dust 21 that settle more quickly inside the pail 2. Mixing the powdery material 10 with liquid water 12 also generates dust 20 as shown in FIG. 5. Denser concentrations of dust or heavier dust 21 generally remain inside the mixing pail 2, while unwanted airborne dust 22 is propelled up or floats up into the surrounding air outside the pail. The mixing process also generate splashes 25 of material 10 and water 12 that fly around in the mixing pail 2. Some splashes 25 clear the top rim 5 of the pail 2.

First Embodiment

The present invention pertains to a multipurpose dust abatement and splash guard device shown generally by reference numbers 30 in FIGS. 1-6. The device 30 has lower and upper portions 32 and 33 that form an open interior 38 with a central axis 39. As discussed below, the lower portion 32 includes a mounting sleeve 41. The upper portion 33 includes a radial manifold housing 51 with a funnel-shaped lid 71. The components forming the device 30 are preferably made of plastic, such as high density polyethylene (HDPE) or ABS. As discussed below and shown in FIGS. 1A and 1B, the device 30 extends the height of the mixing pail 2, and forms a radial channel 60, radially disbursed air intake 90 and a radial splash guard 110 above the pail rim 5. When placed on the pail 2 and drawing suction from the vacuum 17, the device 30 generates a dust shield zone 105 and dust intake zone 109 above and around the pail and device as in FIGS. 1B, 2 and 3, with the presently understood shapes of these zones being more precisely shown in FIG. 9.

Figure 3:
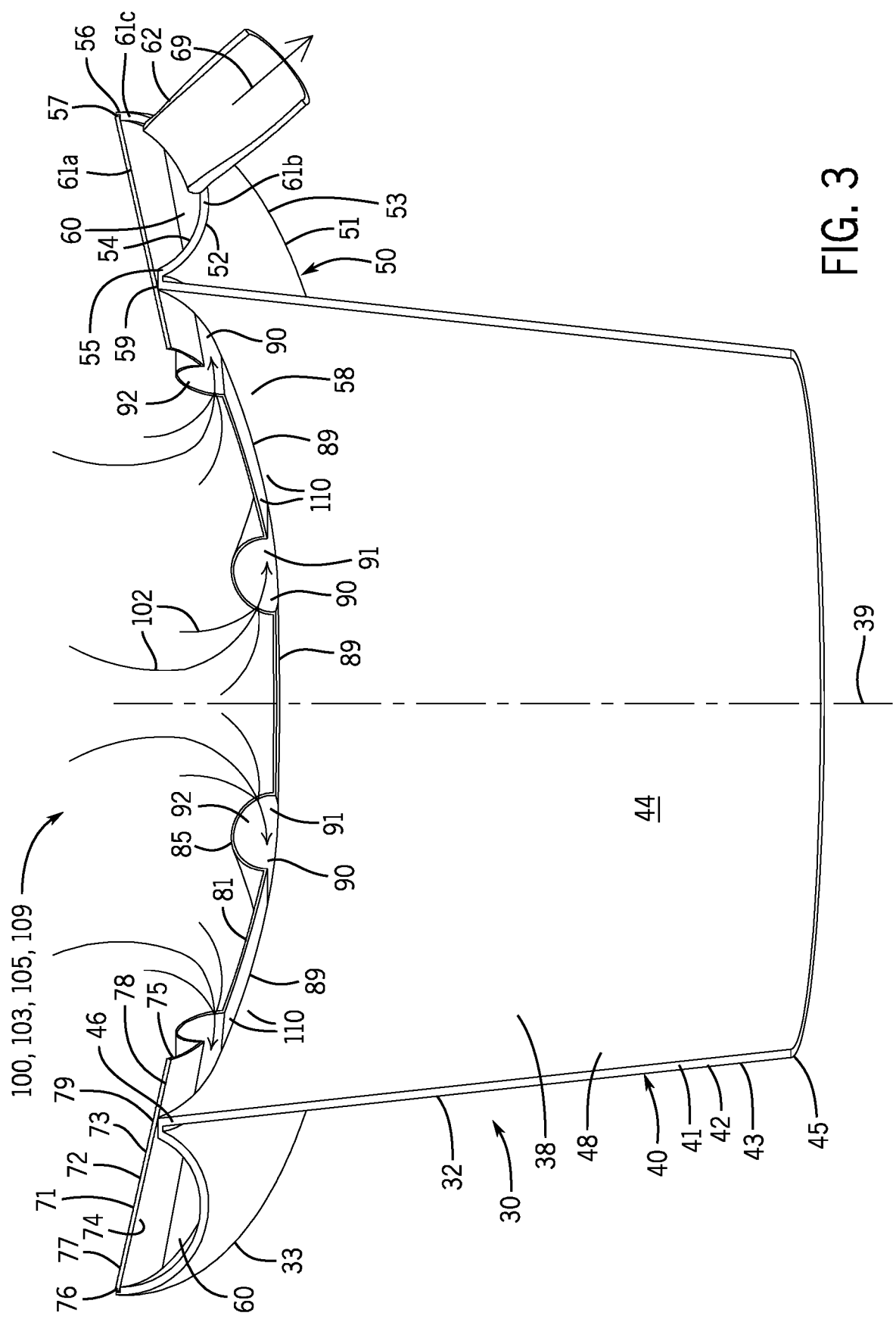
FIG. 3 is a sectional view of the first embodiment of the device showing the underside of the lid and the side wall forming the hooded intake vents and suction ports, and showing the substantially radially uniform airflow pattern and airflow paths over the central opening and into and through its vents and ports.
Figure 4:
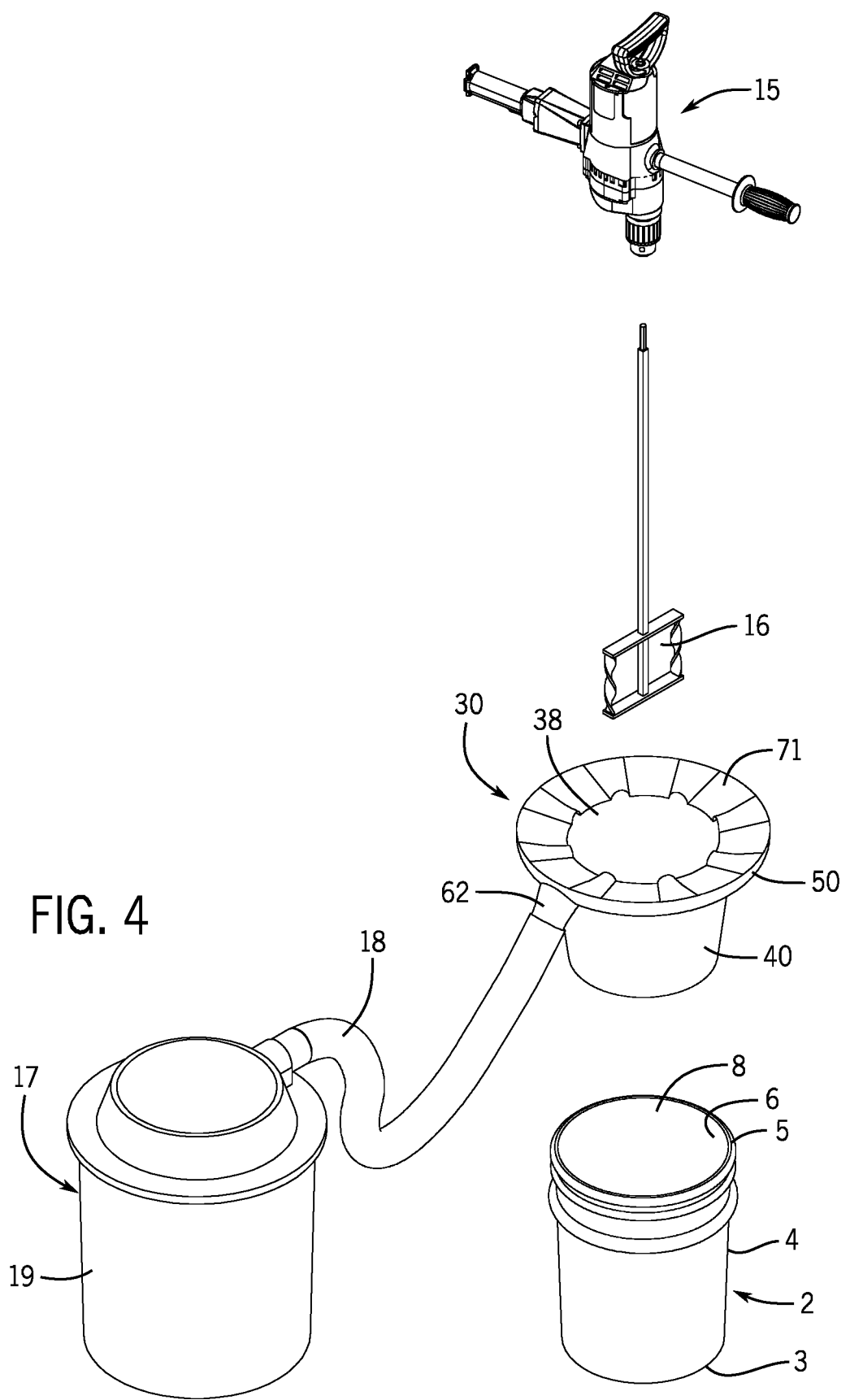
FIG. 4 is an exploded view of the first embodiment of the device, mixing pail, vacuum, power tool and mixing paddles.

The lower portion 32 of the device 30 includes a base or mounting structure 40 having a sleeve 41 formed by a frustoconical sidewall 42 as best shown in FIG. 3. The tapered sidewall 42 is preferably solid and continuous through 360 degrees, and has a degree of flexibility to accommodate a releasable snug fit with the sidewall 4 of the pail 2. The tapered sidewall 42 has inner and outer surfaces 43 and 44, and open lower and upper ends 45 and 46 that form the upper and lower radial perimeters of the frustoconical sleeve 41. The sleeve 41 is tapered with the radial lower end 45 being narrower than the radial upper end 46. The sidewall 42 defines circular openings at its upper and lower ends 45 and 46, and an open tapering interior 48. The outside surface 43 of the sidewall 42 is snuggly received by and seals against the inside surface 6 of the pail 2 to form a seal 49. The seal 49 prevents air from flowing into the pail 2 from between the pail and mounting base 40 during use. The seal 49 also prevents material 10, water 12, dust 20 and splashes 25 from escaping out from between the pail 2 and base 40. The central axes 9 and 39 of the pail 2 and device 30 are colinear during use.

The tapered mounting sleeve 41 is inserted in and secured to the mixing pail 2. The weight of the device 30 is supported by the pail 2, which helps form the seal 49 between them. The sleeve 41 is shaped to accommodate a variety of conventional five to seven gallon pails 2. The diameter of the upper sleeve end 45 is larger than the diameter of the upper pail rim 5. The mounting base 40 shares common central axis 39. The sidewall 42 preferably has a length of about 11 inches, and cross sectional thickness of about ⅛ inch. The lower and upper ends 45 and 46 have diameters of about 10 inches and 13 inches, respectively. The flow 11 of powdery material 10 is poured through the open interior 38 of the device 30. The inside surface 44 of the base sidewall 42 is smooth and free of obstructions to allow material 10, water 12 and splashes 25 to flow down into the container 2. The smooth inside surface 44 also avoids binding contact with the rotating mixing tool 15 during use.

The upper portion 33 of the device 30 includes the radial manifold 50. The radial or ring manifold 50 is formed by a manifold housing 51 and a manifold lid 71. The ring manifold 50 extends radially outwardly from the top 46 of the mounting sleeve 41 and outwardly from the upper rim 5 of the mixing pail 2. The ring manifold 50 has an outer diameter of about 18 inches. The radial manifold 50 also shares common axis 39. The manifold housing 51 has a curved radial wall 52. This radial wall 52 is preferably integrally formed with the base wall 42. The radial wall 52 has a uniform thickness and a cross-sectional bowl shape that resembles the bottom half of a donut as best shown in FIG. 3.

The radial manifold wall 52 has lower and upper surfaces 53 and 54, inner and outer radial ends 55 and 56 and an open interior 58. The inner radial end or perimeter 55 is integrally joined to and extends outwardly from the upper radial end or upper perimeter 46 of the base wall 42, and extends completely around the base wall 42 through 360 degrees. The inner radial perimeter 55 of the bowl-shaped manifold wall 52 is integrally and continuously joined to the upper radial end 46 of the frustoconical sleeve 41. Air, material 10, water 12, dust 20 and splashes 25 do not pass between the base 40 and manifold 50. The outer radial end or perimeter 56 of the bowl-shaped manifold wall 52 forms the outer perimeter of the ring manifold 50. The bowl-shaped wall 52 is pitched about fifteen degrees (15°) so its outer radial perimeter 56 is raised higher than its inner radial perimeter 55. An upwardly facing notch 57 is formed into and around the outer radial perimeter 56.

Figure 2:
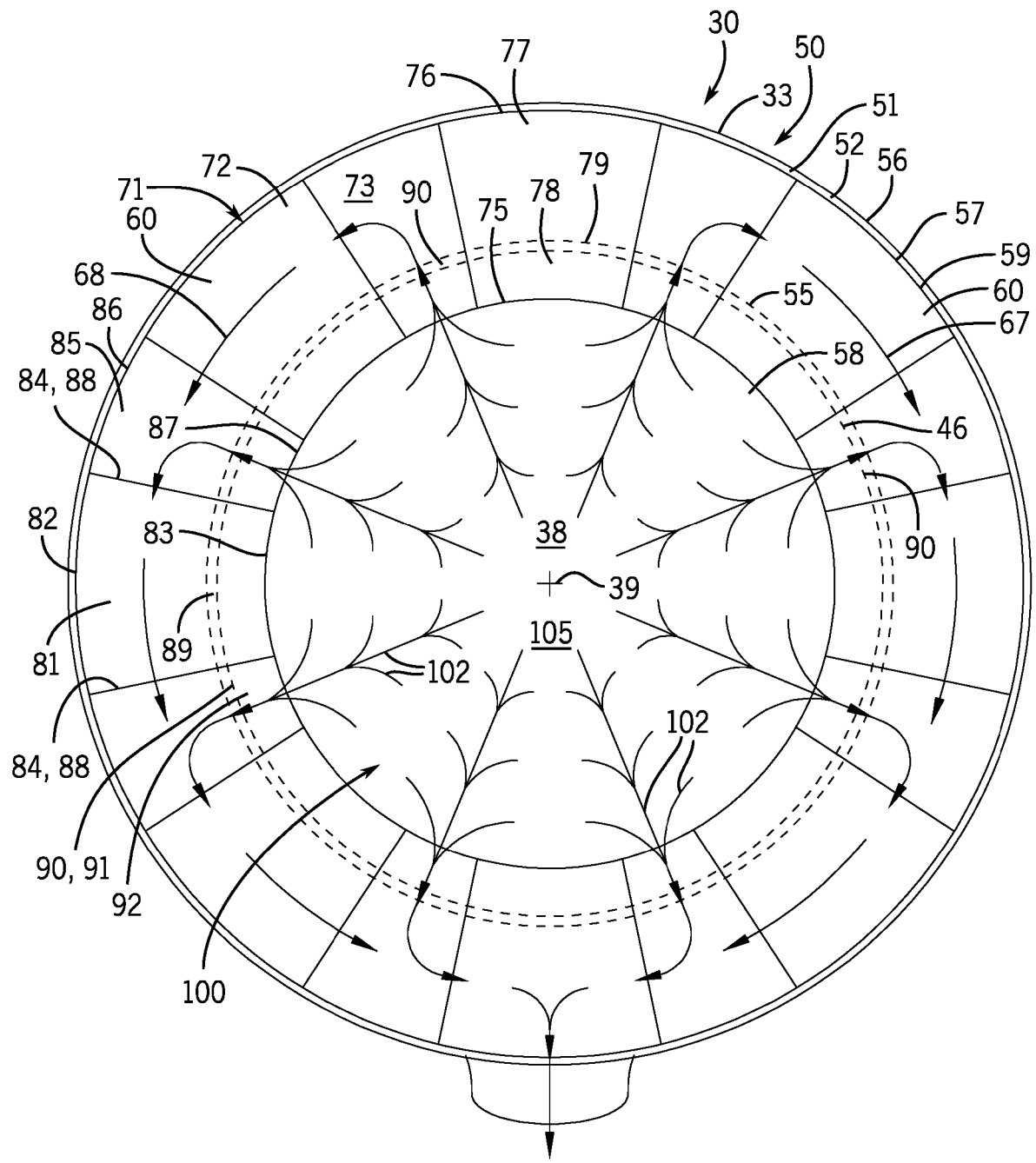
FIG. 2 is a top view of the first embodiment of the device showing the substantially radially uniform airflow pattern and its airflow paths over its central opening and into and through its hooded intake vents, suction ports, radial chamber and exit nozzle.

The manifold housing 51 forms a channel 60 extending around the upper radial perimeter 46 of the mounting base 40. The channel 60 has a uniform cross-sectional shape around its circumference, and is formed by top, bottom and side manifold surfaces 61a-c. One side of the ring manifold 50 has an exit nozzle 62. The channel 60 extends 360 degrees around the base 40 and manifold 50, and is in pneumatic communication with and feeds to the exit nozzle 62. The exit or discharge nozzle 62 has an outer end or port 63 forming an exit opening. The exit port 63 is sized to accommodate a snug and sealed fit with the vacuum hose 18. The vacuum hose 18 is connected to the exit nozzle 62 so that the channel 60 is in pneumatic communication with the suction force of the vacuum 17. As shown in FIG. 2, air is suctioned from the entire channel 60 through the exit nozzle 62 and into the vacuum hose 18. One half or side of the radial channel 60 feeds air along a first path 67 to the exit nozzle 62, and the other half or side of the channel feeds air along a second path 68. The flow paths 67 and 68 merge into a common airflow path 69 at the exit nozzle 62, which flows through vacuum hose 18 to vacuum 17 and its air filter 19a.

The manifold lid 71 is funnel-shaped and preferably takes the form of a disc or cover plate 72. The lid 71 is placed over and received by the manifold housing 51 to form the top 61a of the channel 60. The lid 71 has upper and lower surfaces 73 and 74 and inner and outer radial ends 75 and 76. The outer radial end or perimeter 76 has a diameter of about 17.75 inches, which is slightly smaller than the diameter of the manifold housing outer perimeter 56 so that the lid 71 engages and fits into the radial notch 57 of the manifold housing 51. The lower lid surface 74 continuously engages and rests on the upper surface of the notch 57 around the outer manifold perimeter 56.

The manifold lid 71 has outer and inner portions 77 and 78, and is supported by the manifold housing 51. The outer lid portion 77 forms the top 61a of the manifold channel 60. The outer lid portion 77 extends from the outer radial perimeter 76 to a middle radial arc 79 that is aligned over and rests on the inner radial manifold perimeter 55 or upper radial base perimeter 46. The inner lid portion 78 extends from the radial arc 79 to the inner radial perimeter 75. The inner lip portion 78 forms a cantilevered, inwardly extending, disc-shaped, radial lip or eave. The inner lid perimeter 75 preferably extends inwardly about one inch beyond the 13 inch diameter of the upper sleeve end 46 and inner manifold 55 perimeters. The inner lid perimeter 75 has a smaller diameter of about 10.75 inches.

When the manifold channel 60 draws suction from the vacuum 17, the outer lid portion 78 is pulled down and held against the manifold housing 51. The lid perimeter 76 is pulled down into pressed engagement with the notch 57 of the outer manifold perimeter 56. The radial arc 79 of the lid 71 is pulled down into pressed engagement with the mounting base or manifold perimeters 46 and 55. The outer lid perimeter 76 is in substantially sealed engagement 59 with the outer manifold perimeter 56. As discussed below, the inner lid arc 79 is in periodic sealed engagement 89 with the upper sleeve perimeter 46, the inner manifold perimeter 55, or both.

The manifold lid 71 is an integral piece having a series of altering flat 81 and arched 85 segments as shown in FIGS. 2 and 3. The flat segments 81 have inner, outer and side ends 82-84. The arched segments 85 have inner, outer and side ends 86-88. The sides 88 of the flat segments 81 merge into the sides 88 of the arched segments 85. The outer segment ends 82 and 86 form the continuous flat outer lid perimeter 76, so the lower lid surface 74 continuously seals 59 against the notch 57 of the outer manifold perimeter 56. The inner segment ends 83 and 87 form the periodically undulating inner lid perimeter 75.

The flat and arched segment 81 and 85 are pitched to slope down toward the open interior 38 of the device 30. The flat segments 81 are pitched a first amount of about 15 degrees (15°). The crests of the arched segments 85 are pitched a second amount of about 5 degrees (5°). The differing pitch amounts cause the height of the arched segments to grow in size the closer they are to the inner lid perimeter 75. The width of the arched segments 85 also decrease in size the closer they are to the inner lid perimeter 75. The increasing height and decreasing width of the arched segments 85 cause their degree of arch to be more pronounced along their inner lid ends 87.

The manifold housing 51 and arched lid segments 85 form the radially disbursed air intake 90. The air intake 90 faces inwardly toward the centerline 39 of the device 30, and is dispersed circumferentially around the inner perimeter 55 of the radial manifold 50. The air intake 90 has a total size of about five square inches, which is about the same as the cross-sectional area of the conventional vacuum hose 18. The air intake 90 is preferably formed by spaced suction ports 91 with hooded intake vents 92 dispersed around the inner manifold perimeter 55. The radially disbursed air intake 90 and its ports 91 are positioned along an intake level 95 that is even with the intersection of the inner housing wall perimeter 55 and mounting sleeve upper perimeter 46. When the device 30 is secured to a pail 2, the intake level 95 is typically above and parallel to the top 5 of the pail 2. In the preferred embodiment, there are eight flat segments 81, eight arched segments 85 and eight suction ports 91. The eight suction ports 91 are preferably uniformly dispersed at 45 degree (45°) increments around the inner manifold perimeter 55. Each port 91 has a semicircular shape with a diameter of about 1.3 inches and an area of about 0.6 square inches. The cumulative or total area of the ports 91 is about five square inches.

The lower surfaces 74 of the flat segments 81 of the radial lid 71 rest on the upper sleeve end 46 and inner manifold end 55. When suction is drawn via the vacuum 17, the manifold lid 71 is drawn down so that the radial lid support location 79 of each flat segment 81 is drawn down into pressed engagement with and forms a seal 89 with the sleeve 41 and manifold housing 51. Material 10, water 12 and splashes 25 do not pass through this seal 89, which forms about two-thirds of the circumference of the inner manifold perimeter 55. The lid 71 is sufficiently rigid that the arched segments 82 do not deform and their lower surfaces 74 remain spaced from the upper sleeve end 46 and inner manifold end 55 to form suction ports 91. The suction ports 91 form about one-third of the circumference of the inner manifold perimeter 55. When the suction force of the vacuum 17 is turned off, the lid 71 is released from pressed engagement with the mounting base wall 42 and manifold housing wall 52, and it is free to be removed for cleaning.

A hooded intake vent 92 is positioned in front of each suction port 91. The hooded vents 92 are formed by the arced segments 85 of the inner portion 78 of the manifold lid 71. The arched segments 85 form the top and side walls of each vent 92. The vents 92 have an open bottom with no bottom wall. The hooded and bottomless vents 92 extend axially inward from the suction ports 91 toward the central axis 39 of the device 30.

The radially distributed air intake 90, such as via suction ports 91 and vents 92, is distributed around the circumference of the inner manifold perimeter 55 to produce a substantially uniform, radially disbursed, volumetric air intake 100 around the inner perimeter 55 and over the open interior 38 of the device 30 as best shown in FIGS. 2 and 3.

The airflow path of travel 102 for the suction ports 91 and hooded vents 92 extend axially inward toward centerline 39 and upward through the open manifold interior 58. The substantially uniform, radially disbursed air intake 100 and airflow path of travel 102 form a dust shield zone 105 over the top 5 of the pail 2 and the otherwise open interior 38 of the device 30. The dust shield zone 105 also forms within the open interior 38 of the upper portion 33 or open manifold interior 58 of the device 30.

The radially uniform air intake 100 inhibits air and dust 20 from being draw up from inside 8 the pail 2. The bottom 3 and sidewall 4 of the pail 2 and the sleeve 41 and seal 49 of the device 30 close off the pail and device from below the ports 91. The closed environment below the ports 91 and the substantially uniform, radially disbursed, volumetric air intake 100 prevent or substantially inhibit the airflow 102 from extending down into or below the top 5 of the pail 2. The lower level 106 of the dust shield zone 105 inside the device 30 is at a level proximal to and just below the level 95 of the suction ports 91. The airflow path of travel 102 for the suction ports 91 and hooded vents 92 extend inward and bend upward as shown in FIGS. 2 and 3. Thus, the airflow paths 102 for the spaced suction ports 91 generate a substantially radially uniform inward and upward bending airflow pattern 103 around the circumference of the pail 2 and device 130 relative to centerlines 9 and 39. After bending upward, the airflow pattern 103 disburses outwardly above and around the circumference of the container 2 and device 30 as in FIG. 1B and 9.

The uniform pattern of airflow 103 generates an air intake zone or airborne dust consumption zone 109 over and around the top of the device 30 from which airborne dust 22 is drawn into the device. Airborne dust 22 generated in or otherwise entering the air intake zone or region 109 flows into the suction ports 91. The dust shield zone 105 is within the air intake zone 109. The dust shield zone 105 has a thickness or height as shown in FIG. 1B, with its mushroom-like shape being more precisely shown in FIG. 9. Inside 38 the device 30, the lower level 106 of the dust shield 105 is proximal to and about one to four inches below the bottom of the intake ports 91 for a vacuum 17 producing an airflow of about 160 cfm. For a longer sleeve device 30, the lower level 106 is typically well above the rim 5 of the pail 2. Outside the device 30, the lower level 107 of the dust shield 105 is generally even with the top 35 of the device 30. The dust shield zone 105 extends upwardly to an upper level 108 about one half to one foot above the top 35 of the device 30. Lighter airborne dust 22 generated in or otherwise flowing into the dust shield region 105 within the intake zone 109 is reliably drawn by the airflow 102 into the suction ports 91. Denser and heavier flows 11 of material 10 and dust 21 as well as denser flows of water 12 are not adversely affected by the airflow 102, and pour or pass through the dust shield 105 and air intake 109 zones and into the mixing pail 2 as shown in FIGS. 1B and 9. Dust 20 below the lower level 106 of the dust shield zone 105 inside the device 30 is not drawn into the ports 91 by the airflow and is allowed to settle on the surface 14 of the material and water mixture 10 and 12. Even much of the airborne dust 22 (e.g., particles greater than about 10 microns) floating inside the pail 2 settles relatively quickly after the pouring or mixing of material is completed, and before the device 30 is typically removed from the pail.

Figure 6:
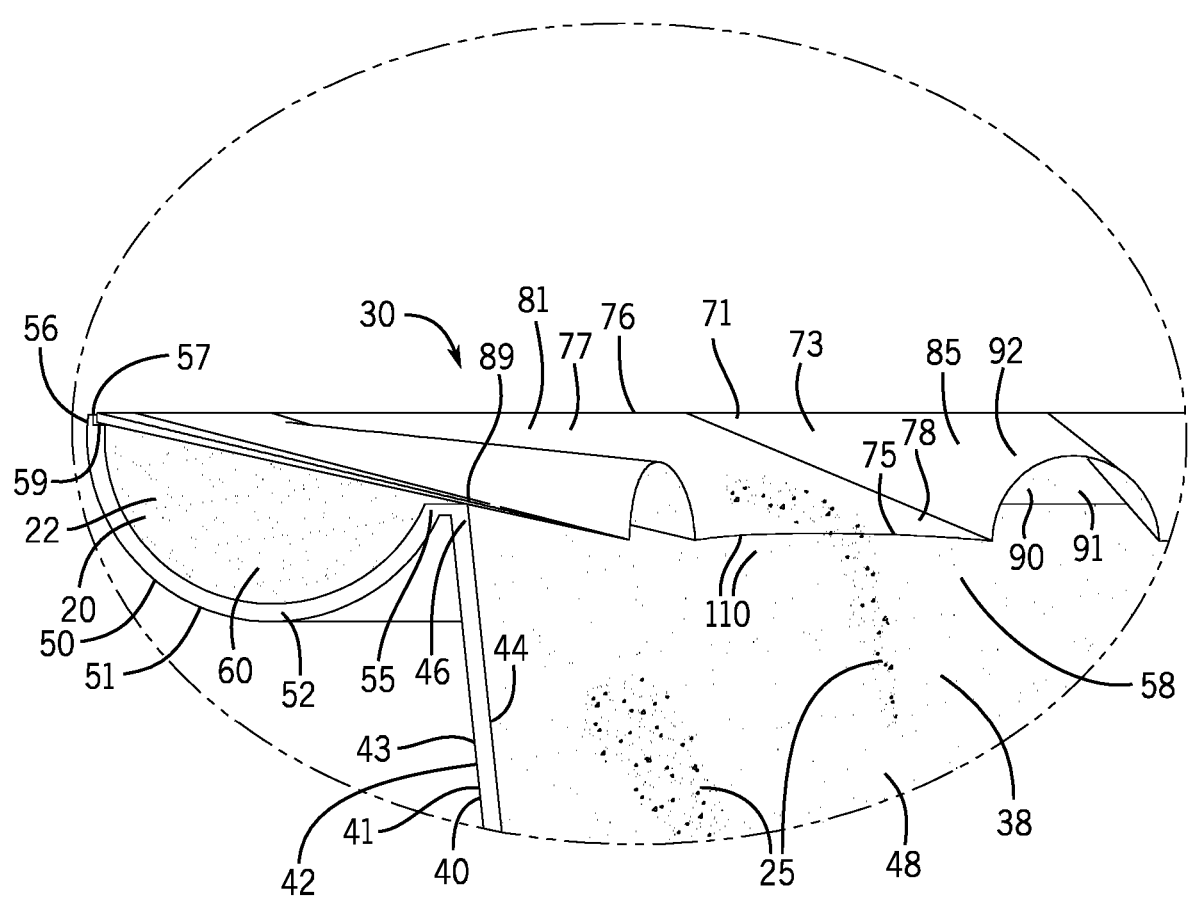
FIG. 6 is an enlarged sectional view of the first embodiment showing the mounting base, manifold housing and manifold lid, and showing splashes of material around the baffle and on the lid, with dust inside the central opening being vented through the arched vents and suction ports and into the radial chamber of the device.

The base wall or mounting sleeve 42 and inner radial portion 78 of the lid 71 form a splash baffle 110 that prevents splashes 25 from escaping the mixing container 2 as shown in FIGS. 5 and 6. The baffle 110 extends 360 degrees around the top of the device 30 and is located above the pail rim 5.

The radial baffle 110 has a generally L-shaped configuration formed by the inner sleeve wall surface 44 and the lower lid surface 74 of inner lid portion 78. Splashes 25 that strike the sleeve wall surface 44 or inwardly extending lip surface 74 are redirected back into the mixing container 2. Splashes 25 that are propelled virtually straight up, and thus do not strike the baffle 110, either fall by gravity back into the pail 2 or land on the top surface 73 of the funnel-shaped manifold lid 71 and flow back into the container 2.

Second Embodiment

Figure 7:
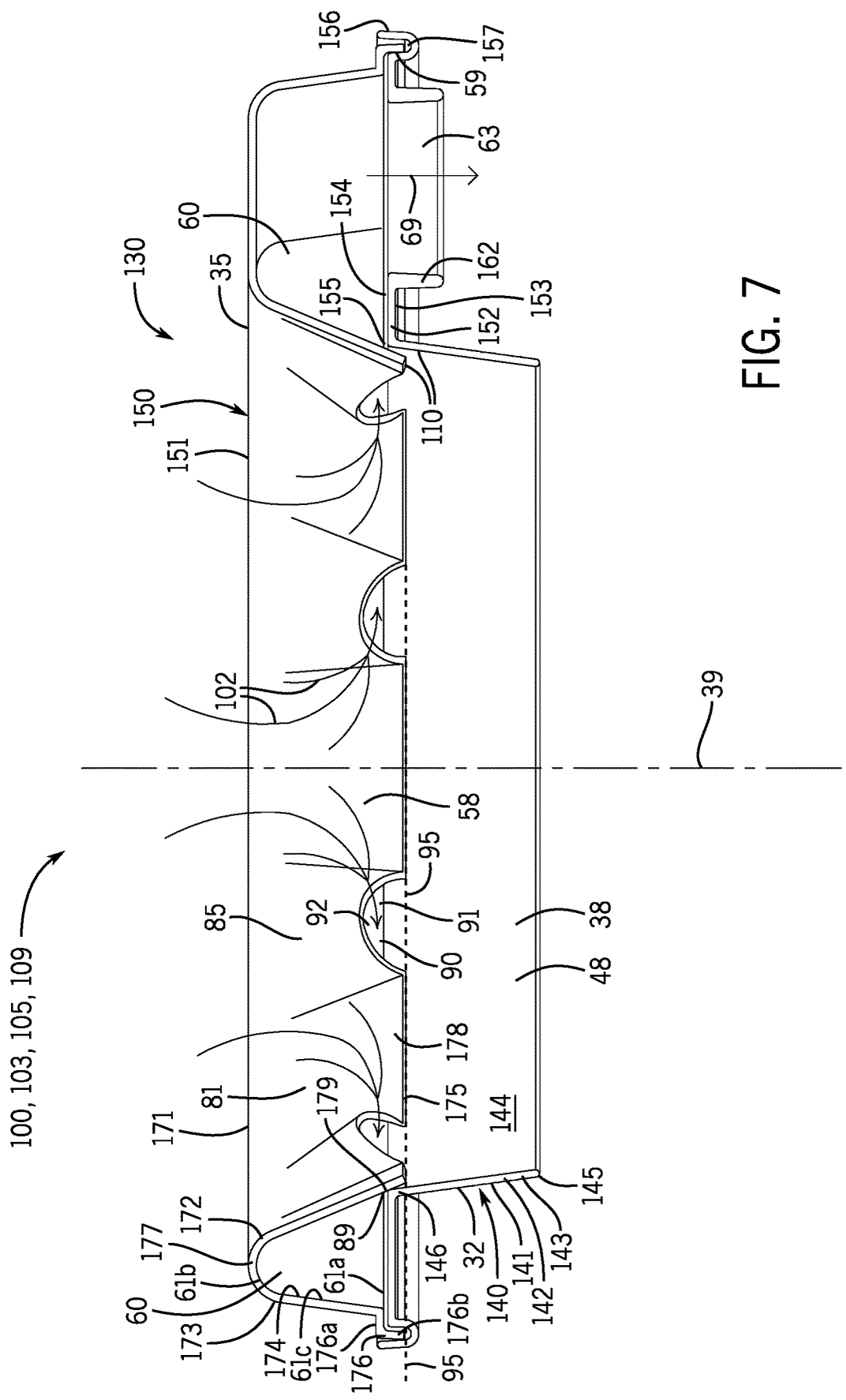
FIG. 7 is a side sectional view of a second embodiment of the device including a manifold sleeve and manifold housing formed by a housing platform and housing cover.
Figure 8:
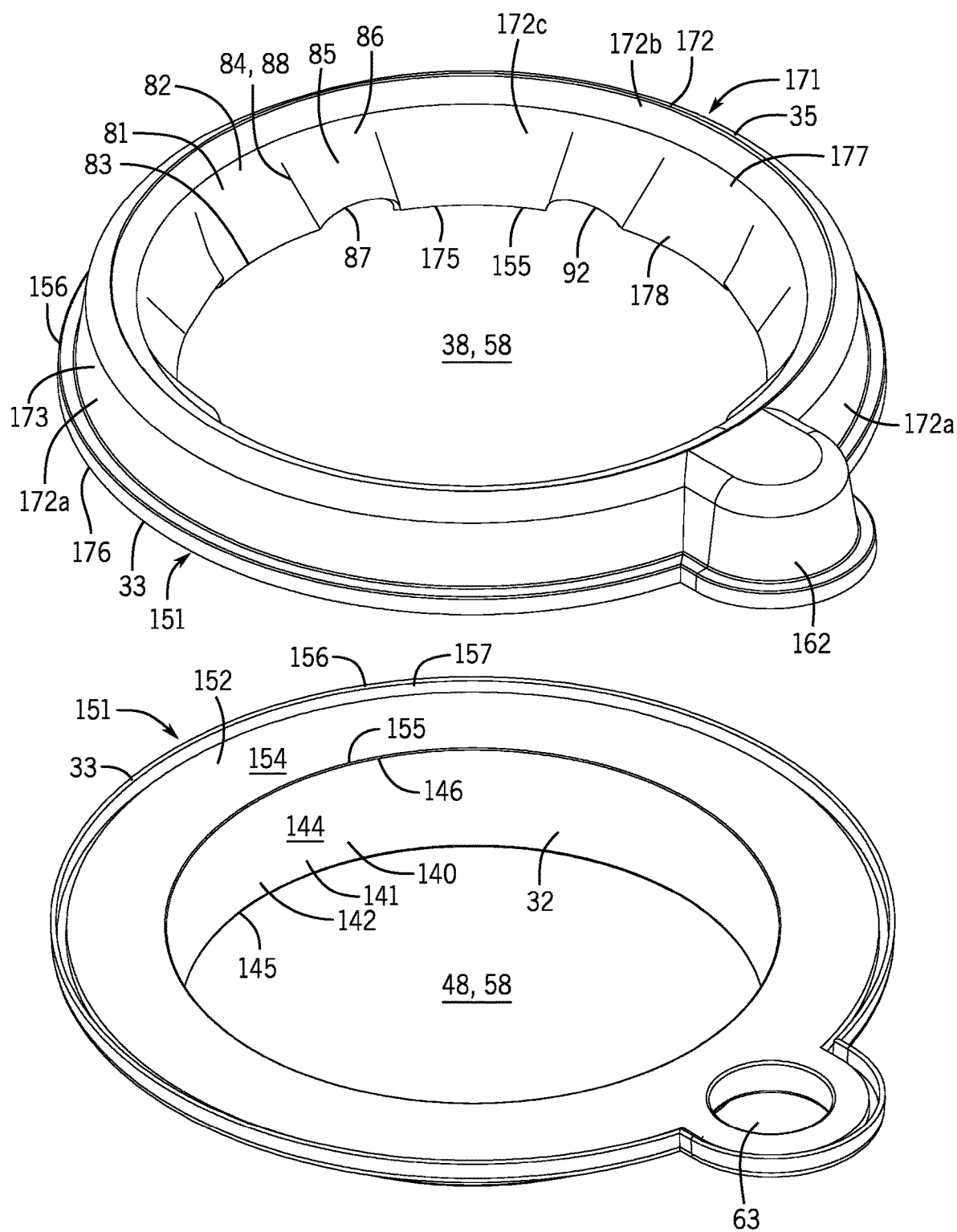
FIG. 8 is an exploded view of the second embodiment of the device showing the manifold cover and the integral manifold platform and mounting sleeve.

FIGS. 7-9 show a second embodiment of the multipurpose dust abatement and splash guard device 130 that is more compact than the first embodiment. The sleeve 141 of the mounting base 140 has a shorter height, and the radial manifold 150 has a smaller diameter. The device 130 is less than about four inches in total height, and the manifold 150 has a diameter of about sixteen inches. While the mounting structure 140 and radial manifold 150 differ in some respects to the device 30 shown in FIGS. 1-6, many structural and operational features (e.g., air flow) remain the same. Like the first embodiment, the device 130 is preferably made of plastic and has lower and upper portions 32 and 33 that form an open interior 38 with a central axis 39. The ring manifold 150 extends radially outwardly from the top 46 of the mounting sleeve 141 and outwardly from the upper rim 5 of the container 2. The device 130 extends the height of the container 2, but to a lesser degree, and forms a functionally similar radial channel 60 with similar airflow paths 67-69 that generate a radially disbursed air intake 90 and radial splash guard 110 around or above the container rim 5. When placed on the container 2 and drawing suction from the vacuum 17, the device 130 generates a radial dust shield zone 105 and airborne dust consumption zone 109 inside and above the device as shown in FIGS. 1B, 2, 3, with the presently understood shapes of these zones being more precisely shown in FIG. 9.

The lower portion 32 of the device 130 includes a base or mounting structure 140 with a shorter sleeve 141 and frustoconical sidewall 142 as shown in FIGS. 7 and 8. The sleeve wall 142 has a height of about two inches, and is tapered about 7 to 8 degrees. The outside surface 43 of the sleeve wall 142 is snuggly received by and seals against the inside surface 6 of the container sidewall 4 to form a seal 49. The central axes 9 and 39 of the container 2 and device 130 are colinear during use. The sleeve 141 and its sidewall 142 are shaped to snuggly engage and seal against the sidewall 4 of a variety of conventional 3-½ to 7 gallon pails 2. The lower and upper sleeve ends 45 and 46 have diameters of about 11 inches and 11.5 inches, respectively. For containers 2 with rim 5 diameters between about 11.5 to 13 inches, the upper portion 33 of the device 130 can rest on and seal against the container rim 5, without sidewall 142 sealing against the inside surface 6 of the container sidewall 4.

The upper portion 33 of the device 130 includes a radial manifold 150 formed by a modified manifold housing 151 construction. The manifold housing 151 includes a platform 152 and cover 171. The outer diameter of the manifold 150 is about 15.5 inches through its main body, and 17.7 inches across its wider section that includes the discharge port 162. The radial manifold 150 also shares common axis 39 with mounting sleeve 141. The disc-shaped manifold platform 152 forms a radial platform wall 152 with flat lower and upper surfaces 153 and 154, and its inner and outer radial perimeters 155 and 156 are at the same horizontal level. The radial inner end or perimeter 155 of the platform wall 152 is preferably integrally formed with the upper perimeter 46 of the sleeve wall 142, and extends completely around the sleeve wall 142 through 360 degrees. Air, material 10, water 12, dust 20 and splashes 25 do not pass between the sleeve wall 142 and manifold platform wall 152. The radial outer end or perimeter 156 of the platform 152 forms an upward facing U-shaped radial notch 157 extending completely around the outer platform perimeter. This notch 157 helps join the housing cover 171 to the manifold platform 152 to form a continuous seal 159 around the perimeter of the radial manifold 150. The outer radial end or perimeter 156 of the manifold platform 152 forms the outer perimeter of the ring manifold 150.

The manifold platform 152 and housing cover 171 form a channel 60 extending around the upper radial perimeter 46 of the mounting base 40. The channel 60 has a uniform cross-sectional shape around its circumference, except in the area of the discharge nozzle, and is formed by the top surface 154 of manifold platform 152 and the top and sides of the inner surface 174 of the manifold cover 171. One side of the ring manifold 150 has an exit nozzle 162. The channel 60 extends 360 degrees around the base 40 and manifold 150, and is in pneumatic communication with and feeds to the exit nozzle 162. The airflow paths 67-69 through channel 60 remain substantially the same as in the first embodiment, with air and dust being suctioned out exit nozzle 162 and through hose 18 to vacuum 17.

The manifold housing cover 171 is formed by a wall 172 with an inverted U-shape including an outer riser portion 172a, rounded top portion 172b and inner funnel portion 172c as shown in FIGS. 7 and 8. The cover 171 has upper and lower surfaces 173 and 174 and inner and outer ends 175 and 176. The manifold cover 171 is placed over and received by the manifold platform 152, so that the manifold platform 152 forms the bottom 61b of the channel 60 and the cover 171 forms the top 61a and sides 61c of the channel 60. The outer radial end 176 of the wall 172 forms the bottom of the riser 172a, and has an offset or L-shape with a shoulder 176a and neck 176b. The shoulder 176a rests on the platform upper surface 154, and the neck 176b is received by the platform notch 157 to form the continuous seal 159 around the outer perimeters 156, 176 of the manifold platform 152 and cover 171. The outer radial end or perimeter 176 of the main body of the manifold cover 171 has a diameter of about 15 inches, which is slightly smaller than the diameter of the outer platform perimeter 156, so that the neck 176b of the cover 171 engages and fits into the platform radial notch 157. The lower surface 74 of the shoulder 176a continuously engages and rests on the upper platform surface 154 adjacent notch 157 around the outer manifold perimeter 156.

The housing cover 171 has outer and inner portions 177 and 178. The outer cover portion 177 forms the top 61b and sidewalls 61c of the manifold channel 60. The outer cover portion 177 extends from the outer radial perimeter 176 to a middle radial arc 179 that is aligned over and rests on the inner radial platform perimeter 155 or upper radial sleeve perimeter 146. The inner cover portion 178 extends from the radial arc 179 to the inner radial perimeter 175. The inner cover portion 178 forms a cantilevered, inwardly extending, disc-shaped, radial lip or eave. The inner cover perimeter 175 preferably extends inwardly about one inch beyond the upper sleeve and inner platform perimeters 146 and 155, so that the inner eave perimeter 175 has a smaller diameter of about 9.5 inches.

When the manifold channel 60 draws suction from the vacuum 17, the outer housing cover portion 178 is pulled down and held against the manifold platform 152. The shoulder 176a and neck 176b of the outer cover perimeter 76 are pulled down into pressed engagement with the notch 157 of the outer platform perimeter 156. The radial arc 179 of the cover 171 is pulled down into pressed engagement with the sleeve or manifold perimeters 146 and 155. The outer cover perimeter 176 is in substantially sealed engagement 59 with the outer platform perimeter 156. As discussed below, the inner cover arc 179 is in periodic sealed engagement 89 with upper sleeve perimeter 146, inner platform perimeter 155, or both.

The manifold housing cover 171 is an integral piece. Its funnel portion 172c has a series of altering flat 81 and arched 85 segments similar to the first embodiment. The flat segments 81 have inner, outer and side ends 82-84. The arched segments 85 have inner, outer and side ends 86-88. The sides 88 of the flat segments 81 merge into the sides 88 of the arched segments 85. The outer segment ends 82 and 86 are along and transition into the rounded top portion 172b of the cover 171. The inner segment ends 83 and 87 form the periodically undulating inner cover perimeter 175.

The flat and arched segment 81 and 85 of funnel portion 172c are pitched to slope down toward the open interior 38 of the device 130 as shown in FIGS. 7 and 8. The flat segments 81 pitch or funnel down significantly more than the crests of the arched segments 85. The flat segments 81 pitch down at an angle of about 67 degrees (67°). The crests of the arched segments 85 pitch down at an angle of about 43 degrees (43°). The differing pitch amounts cause the height of the arched segments 85 to grow in size the closer they are to the inner perimeter 175. The width of the arched segments 85 also decrease in size the closer they are to the inner perimeter 175. The increasing height and decreasing width of the arched segments 85 cause their degree of arch to be more pronounced along their inner ends 87.

The manifold platform 152 and arched segments 85 of cover 171 form the radially disbursed air intake 90. As in the first embodiment, the air intake 90 faces inwardly toward the centerline 39 of the device 130, and is dispersed circumferentially around the inner perimeter 155 of the radial manifold 150. The air intake 90 has a total size of about five square inches, which is about the same as the cross-sectional area of the conventional vacuum hose 18. The air intake 90 is preferably formed by spaced suction ports 91 with hooded intake vents 92 dispersed around the inner manifold perimeter 55. The radially disbursed air intake 90 and its ports 91 are positioned along an intake level 95 that is even with the intersection of the inner housing platform perimeter 55 and mounting sleeve upper perimeter 46. When the device 130 is secured to a pail 2, the intake level 95 is above or even with the top 5 of the pail 2, and is typically parallel to the pail top 5. Again, there are preferably eight flat segments 81, eight arched segments 85 and eight suction ports 91. The eight suction ports 91 are preferably uniformly dispersed at 45 degree (45°) increments around the inner platform perimeter 155.

Each port 91 has a semicircular shape with a diameter of about one inch, so that the eight ports have a total port area of about five square inches.

To achieve a more substantially uniform volumetric airflow distribution and airflow pattern 103 around the circumference of the device 130, the size (e.g., diameter and area) of the ports 91 gradually increase the further the ports are from the discharge nozzle 162. The two ports 91 straddling and closest to the discharge nozzle 162 (each spaced 22.5° from nozzle) each have an area of about 0.6 square inches. The next two adjacent ports (67.5° from nozzle) each have an area of about 0.65 square inches, and the next two adjacent ports (112.5° from nozzle) each have an area of about 0.7 square inches. The two ports 91 furthest from the discharge nozzle 162 (157.5° from nozzle) each have an area of about 0.75 square inches. The eight ports 91 have a total area of about 5.4 square inches.

The lower surfaces 174 of the flat segments 81 of the radial manifold cover 171 rest on the upper sleeve end 146 and inner platform end 155. When suction is drawn via the vacuum 17, the manifold cover 171 is drawn down so that the radial cover support location 179 of each flat segment 81 is drawn down into pressed engagement with and forms a seal 89 with the base sleeve 141 and manifold platform 152. Material 10, water 12 and splashes 25 do not pass through this seal 89, which forms about two-thirds of the circumference of the inner platform perimeter 155. The cover 171 is sufficiently rigid that the arched segments 82 do not deform and their lower surfaces 174 remain spaced from the upper base end 146 and inner platform end 155 to form suction ports 91. The suction ports 91 form about one-third of the circumference of the inner platform perimeter 155. When the suction force of the vacuum 17 is turned off, the manifold cover 171 is released from pressed engagement with the sleeve wall 142 and platform wall 152, and it is free to be removed for cleaning.

A hooded intake vent 92 is positioned in front of each suction port 91. The hooded vents 92 are formed by the arced segments 85 of the eave or inner portion 178 of the manifold cover 171. The arched segments 85 form the top and side walls of each vent 92. The vents 92 have an open bottom with no bottom wall. The hooded and bottomless vents 92 extend axially inward from the suction ports 91 toward the central axis 39 of the device 130.

The radially distributed air intake 90, such as via suction ports 91 and vents 92, is distributed around the circumference of the inner manifold perimeter 155 to produce a substantially uniform, radially disbursed, volumetric air intake 100 around the inner perimeter 155 and over the open interior 38 of the device 130 as shown in FIGS. 2 and 3. The airflow path of travel 102 for the suction ports 91 and hooded vents 92 extend axially inward toward the centerline 39 and upward through the open manifold interior 58. The substantially uniform, radially disbursed air intake 100 and airflow path of travel 102 form a dust shield zone 105 over the top 5 of the container 2 and the otherwise open interior 38 of the device 130 as shown in FIGS. 1B and 9. The dust shield zone 105 is also within the open interior 38 of the upper portion 33 of the device 130.

The radially uniform air intake 100 inhibits air and dust 20 from being drawn up from inside 8 the container 2. The bottom 3 and sidewall 4 of the container 2 and the sleeve 141 and seal 49 of the device 130 close off the container and device from below the ports 91. The closed environment below the ports 91 and the substantially uniform, radially disbursed, volumetric air intake 100 prevent or substantially inhibit the airflow 102 from extending down into the container 2 below the lower level 106 of the dust shield zone 105, which is generally near the lower end 145 of the shorter sleeve 141. The lower level 106 of the dust shield zone 105 inside the device 130 is proximal to and just below the level 95 of the suction ports 91. The airflow path of travel 102 for the suction ports 91 and hooded vents 92 extend inward and bend upward as shown in FIGS. 2 and 3. Thus, the airflow paths 102 for the spaced suction ports 91 generate a substantially radially uniform inward and upward bending airflow pattern 103 around the circumference of the container 2 and device 130 relative to centerlines 9 and 39. After bending upward, the airflow pattern 103 disburses outwardly above and around the circumference of the container 2 and device 130 as in FIG. 1B and 9.

The uniform pattern of airflow 103 generates an air intake zone or airborne dust consumption zone 109 over and around the top of the device 130 from which airborne dust 22 is drawn into the device. Airborne dust 22 generated in or otherwise entering the air intake zone or region 109 flows into the suction ports 91. The dust shield 105 is within the air intake zone 109. The air intake zone 109 continues upwardly and outwardly from above the upper level 108 of the dust shield zone 105. The dust shield zone 105 has a thickness or height as shown in FIG. 1B, with its mushroom shape being more precisely shown in FIG. 9. Inside 38 the device 130, the lower level 106 of the dust shield 105 is proximal to the bottom level 95 of the intake ports 91. The lower level 106 of the dust shield zone 105 is in the range of about one to four inches below the ports 91, and about two inches below the ports for a vacuum generating about 160 cfm airflow. This puts the lower level 106 in close proximity to (i.e., just above, even with or just below) the rim 5 of the container 2, depending on the diameter of the top of the container and airflow (cfm) produced by the vacuum 17. Outside the device 130, the lower level 107 of the dust shield 105 is generally even with the top 35 of the device 130. The dust shield zone 105 extends upwardly to an upper level 108 of about one half to one foot above the top 35 of the device 30. For a conventional 8 to 12 amp, 160 cfm, wet-dry vacuum 17, the upper level 108 is about eight inches above the top 35 of the device 30. Aerodynamically lighter, airborne dust 22 (e.g. particles less than 50 to 100 microns released from the main flow of material 11) generated in or otherwise flowing into the dust shield region 105 is reliably (i.e., about 95 to 100 percent, and likely 99 to 100 percent) drawn by the airflow 102 into the suction ports 91 or passes through the dust shield zone and settles in the container 2. Denser, more compacted and heavier flows 11 of material 10 and dust 21 as well as denser flows of water 12 are not adversely affected by the airflow 102, and pour or pass through the dust shield 105 and air intake 109 zones and into the container 2 as shown in FIGS. 1B and 9. Dust 20 below the lower level 106 of the dust shield zone 105 inside the device 130 is not drawn into the ports 91 by the airflow 102 and is allowed to settle on the surface 14 of the material and water mixture 10 and 12.

The sleeve base wall 142 and inner radial portion 178 of the cover 171 form a splash baffle 110 that prevents splashes 25 from escaping the mixing container 2 as in FIG. 7. The baffle 110 extends 360 degrees around the top of the device 130 and is located above or even with the container rim 5. The radial baffle 110 has a generally L-shaped configuration formed by the inner sleeve wall surface 144 and the lower surface 174 of the inner eave 178 of the cover 171. Splashes 25 that strike the base wall surface 144 or inwardly extending eave surface 174 are redirected back into the mixing container 2. Splashes 25 that are propelled virtually straight up, and thus do not strike the baffle 110, either fall by gravity back into the container 2 or land on the top surface 173 of the funnel-shaped cover 171 and flow back into the container.

Operation of Dust Abatement and Splash Guard Device

Although the operation of the dust abatement and splash guard device 30, 130 should be readily understood based on the above, the following is provided for the convenience of the reader. To minimize dust 20 and splatter 25, all or most of the water 12 is first poured into the container or mixing pail 2. Either before or after the water is poured into the container 2, the device 30, 130 is inserted into and over the container 2 until the base wall 42, 142 engages and seals 49 against the wall 4 or rim of the container 2 as in FIGS. 1A, 1B and 9. After connecting the vacuum hose 18 to the discharge nozzle 62, 162 of the device 30, 130 and activating the vacuum 17, the device generates a substantially radially uniform air intake 100 formed by the airflow paths of travel 102 into its radially distributed air intake 90 or suction ports 91 as shown in FIG. 2. As the airflow paths 102 bend upward as in FIG. 3, the substantially uniform radial air intake 100 forms the dust shield 105 and air intake zone 109 above the device 30 as in FIGS. 1B and 9. The dust shield 105 extends upward inside the air intake zone 109 to a height of about one half to one foot above the device. The lower pressure or suction inside the manifold channel 60, relative to the pressure of the surrounding air, pulls down the manifold lid 71 or cover 171 to seal 59 and 89 the lid or cover against the manifold housing 51 or platform 152.

Powdery material 10 is then poured into the container 2 as in FIGS. 1A, 1B and 9. The package 13 of powdery material 10 is brought over and just above the top of the device 30, 130 and tilted to pour out the material. The dense flow 11 of material 10 pours through the air shield and intake zones 105 and 109, past the air intake 90 and suction ports 91, through the interior 38 of the device 30 or 130, and into the water 12 inside 8 the container 2 or accumulates on the surface 14 of the mixture. The inner disc-shaped radial eave 78, 178 shields the air intake 90 and suction ports 91 from the downward flow 11 of material 10 or water 12. The radial eave 78, 178 spaces the flows 11 of material 10 and water 12 from the air intake 90 and suction ports 91. The arched segments 85 forming the hooded vents 92 direct downward flows 11 of material 10 and water 12 to the sides of the vents, so that they do not flow directly in front of the suction ports 91 or vents 92. Denser flows 11 of material 10 or water 12 that might enter the bottomless vents 92 fall by gravity into the container 2. Still, the suction ports 91 and vents 92 capture the lighter airborne dust 22 that would otherwise escape into the surrounding air.

The device 30, 130 captures the airborne dust 22 forming above the suction ports 91 within the intake or airborne dust consumption zone 109, particularly below the upper level 108 of the dust shield zone 105. The device 30, 130 also captures airborne dust 22 propelled or rising up from inside 8 the container 2 to a level at or near the ports 91. Thicker and denser or heavier dust 21 inside 8 the container 2 is allowed to settle onto the surface 14 of the material 10 and water 12 mixture. Aerodynamically lighter, airborne dust 22 is captured by the device 30, 130 and sent to the vacuum 17 and air filter 19a to remove the dust from the air.

Airborne dust 22 generated after a flow 11 of powdery material 10 enters or passes downwardly through the dust shield zone 105 does not escape the container 2 and device 30, 130. Airborne dust 22 generated in or flowing into the dust shield region 105 is either drawn by the flow 11 of material 10 into the container 2, or is drawn by the airflow 102 into the suction ports 91 depending on how close the dust passes to the intake ports 91 and how light of heavy the dust. Airborne dust 22 floating up from inside the container 2 and into the dust shield zone 105 is also captured by the device 30, 130. Much of the airborne dust 22 generated in or floating into the airborne intake zone 109 is also captured by the device 30, 130, albeit less reliably than airborne dust that enters the dust shield zone 105. Heavier dust 21 passing downwardly through the dust shield zone 105 or generated below its lower level 106 settles in the container 2.

During mixing, paddles 16 are inserted through the open interior 38 of the device 30, 130. The paddles 16 thoroughly mix the material 10 and water 12 together to form the desired building material as in FIGS. 4-6. The mixing process generates more dust 20, as well as splashes 25 of material 10 and water 12. Again, the device 30, 130 captures the dust 20, 22 rising up from the container 2 near the level of the suction ports 91. The device 30 also retains the splashes 25 that strike or land on its sleeve wall 42, 142, lid or cover 71, 171 or radial splash guard 110. During mixing, additional water 12 or material 10 is poured through the device 30, 130 and into the container 2 to achieve the desired consistency of the construction material. The device 30, 130 is then lifted off the container 2 and set aside for further use or cleaning. The device 30, 130 and its internal channel 60 are easily cleaned by removing its lid or cover 71, 171 and washing them down with water.

While the invention has been described with reference to two preferred embodiments, it will be understood by those skilled in the art that various changes may be made and equivalents may be substituted without departing from the broader aspects of the invention. For example, while the preferred embodiments show the sleeve and radial manifold with certain diameters and lengths to accommodate common mixing pails, the device can be made in a variety of sizes, such as large, medium and small, to accommodate containers of varying sizes. In addition, although the preferred embodiments show a radially disbursed air intake 90 formed by eight uniformly disbursed suction ports 91, the number and dispersion pattern of the ports can vary provided they generate a generally radially disbursed air intake 100. It is presently believed there should be at least about four ports to generate an adequate dust shield 105 and airborne dust consumption 109 zones. The number of ports 91 can vary depending on a variety of factors, such as the size of the container 2 and device 30, 130 (e.g., large medium or small), the size of the ports, the type and consistency of powdery material 10 and the strength of the vacuum 17. For embodiments with more than eight ports 91, the size of the ports can decrease. Additionally, while the preferred embodiments show the interior 38, 48 and 58 of the device 30, 130 being completely open, it should be understood that a screen or some other structure could extend into the interior provided the structure did not significantly obstruct the flow 11 of powdery material 10 or water 12 through the device or prevent a mixing paddle from extending through the device. Further, while the preferred embodiments show the mounting structure 40 as a frustoconical sleeve 41 with a tapered sidewall 42, it should be understood that other mounting structures could be used such as clip or hook fasteners to secure the device to the strengthening rings or rim 5 of the pail 2, or a mounting structure with a radially expanding and contracting fastener like a hose fastener clamp or a diaphragm.

I claim:

1. An airborne dust abatement device for use with a container and a suction generating apparatus when pouring or mixing a powdery material such as plaster, grout, cement or the like, the container having a container sidewall, container interior, open upper container end and container opening axis, the container being within surrounding air, the powdery material generating airborne dust when poured through the air as a flow of powdery material into the container and when mixed with a liquid solvent such as water inside the container, the suction generating apparatus having a suction hose, and said airborne dust abatement device comprising:

a mounting structure with a surface that selectively engages and facilitates securement of said abatement device to one of either the container sidewall and the upper container end;

a radial manifold forming a radially disbursed air intake and an enclosed radial channel to pneumatically join said radially disbursed air intake with a discharge nozzle, said manifold having an open manifold interior and a central manifold axis, said mounting structure extending around said radial manifold and aligning said manifold with the open upper container end with said central manifold axis aligned with said container opening axis, said radially disbursed air intake being located along an air intake level, said radial manifold having a radial eave, and radial eave extending inwardly from said radially disbursed air intake toward said central manifold axis, said discharge nozzle being adapted to selectively connect to the suction hose to pneumatically join said radial channel to the suction generating apparatus; and, wherein the suction generating device is selectively operable to provide suction to said radial channel and said radially disbursed air intake to generate a substantially radially uniform pattern of airflow and a dust shield zone, said shield zone extending from a lower boundary proximal said air intake level and up through said open manifold interior and above said device, and wherein the flow of powdery material flows through said shield zone and open manifold interior and into the container interior, and said airflow draws in the airborne dust within said shield zone when one of either pouring and mixing the powdery material.

2. The airborne dust abatement device of claim 1, and wherein said radially disbursed air intake is formed by a plurality of spaced suction ports.

3. The airborne dust abatement device of claim 2, and wherein said radial channel has a channel circumference and said plurality of suction ports are uniformly spaced around said channel circumference, and said plurality of suction ports includes at least four suction ports.

4. The airborne dust abatement device of claim 3, and wherein said plurality of suction ports includes eight suction ports spaced at 45 degree increments around said manifold, each of said ports facing inwardly toward said manifold interior.

5. The airborne dust abatement device of claim 3, and wherein each said suction port has a suction port size, and said suction port size increases as said suction ports are located radially further from said discharge nozzle.

6. The airborne dust abatement device of claim 1, and wherein said dust shield zone has an upper level about one half to one foot above said device.

7. The airborne dust abatement device of claim 6, and wherein said dust shield zone has an upper level about eight inches above said device.

8. The airborne dust abatement device of claim 6, and wherein the airborne dust entering or generated within said dust shield zone is one of either reliably drawn into said radial disbursed air intake and allowed to settle in the container.

9. The airborne dust abatement device of claim 6, and wherein said lower boundary of said dust shield zone extends down about one to four inches below said air intake level.

10. The airborne dust abatement device of claim 9, and wherein said lower boundary of said dust shield zone extends down from said radially disbursed air intake about two inches.

11. The airborne dust abatement device of claim 1, and wherein said radial manifold is a manifold housing with a manifold platform and a manifold cover, said manifold cover having a funnel shaped portion.

12. The airborne dust abatement device of claim 11, and wherein said manifold platform has an inner manifold platform perimeter, said funneled portion has said radial eave extending inwardly from said inner manifold platform perimeter, said radical eave spacing flow of powdery material from said radially disbursed air intake.

13. The airborne dust abatement device of claim 11, and wherein said enclosed radial channel has a top, a bottom and inner and outer sides, said manifold platform forms said bottom of said radial channel, and said manifold cover forms said top and sides of said radial channel.

14. The airborne dust abatement device of claim 11, and wherein said manifold platform has inner and outer manifold platform perimeters, said manifold cover has an outer cover portion, inner and outer cover perimeters and a cover support region, said outer manifold platform perimeter supportably engaging said outer cover perimeter, said inner manifold platform perimeter supportably engaging said cover support region.

15. The airborne dust abatement device of claim 14, and wherein manifold cover is selectively seperable from said manifold platform, said outer manifold platform perimeter engaging said outer manifold cover perimeter to capture said manifold cover, said outer manifold platform perimeter sealingly engaging said outer manifold cover perimeter when the vacuum provides suction to said radial channel, and said inner manifold platform perimeter engages said cover support region between said suction ports, said inner manifold platform perimeter sealingly engaging said cover support region between said suction ports when the vacuum provides suction to said radial channel.

16. The airborne dust abatement device of claim 2, and wherein each said suction port has a hooded intake vent.

17. The airborne dust abatement device of claim 16, and wherein said hooded intake vents are bottomless.

18. The airborne dust abatement device of claim 12, and wherein the container is a mixing pail with a tubular pail sidewall having a circumference, the container opening axis is a central pail axis, and said radial manifold and said radial channel extend completely around the circumference of the tubular pail sidewall, said central manifold axis is colinear with the central pail axis, and said radially disbursed air intake is circumferentially located around said manifold at said air intake level.

19. The airborne dust abatement device of claim 18, and wherein said mounting structure includes a tapered mounting sleeve, and said tapered sleeve and said radial eave form a radial splash guard to retain splashes of the material and water inside the mixing pail when mixing the material and water in the pail.

20. The airborne dust abatement device of claim 19, and wherein said mounting sleeve sealingly engages the pail sidewall.

21. The airborne dust abatement device of claim 20, and wherein said dust abatement device has a weight, the pail sidewall has an inside surface and said mounting sleeve has an outer sleeve surface, and said outer sleeve surface is adapted for pressed engagement with the inside surface of the pail sidewall, and the pail sidewall carries said weight of said dust abatement device.

22. The airborne dust abatement device of claim 21, and wherein said mounting sleeve has an upper sleeve end, said manifold platform has an inner manifold platform end, and said inner manifold platform end is integrally joined to said upper sleeve end.

23. The airborne dust abatement device of claim 22, and wherein the upper pail end has an upper pail diameter, and said upper sleeve end has an upper sleeve diameter, and said upper sleeve diameter is larger than the upper pail diameter.

24. The airborne dust abatement device of claim 18, and wherein the mixing pail has a pail height and said mounting sleeve extends upwardly from the upper open pail end to extend the pail height and positions said radial manifold above the upper open pail end.

25. The airborne dust abatement device of claim 2 and wherein the suction generating device draws in intake air and dust and has an associated air filter, and wherein the dust drawn in by said suction ports is filtered from the intake air by the air filter before the intake air is discharged to the surrounding air.

26. An airborne dust abatement device for use with a mixing pail and a suction generating apparatus when pouring or mixing a powdery material such as plaster, grout, cement or the like, the pail having a circular pail sidewall, pail interior, open upper pail end and central pail axis, the pail being within surrounding air, the powdery material generating airborne dust when poured through the air as a flow of powdery material into the pail and when mixed with a liquid solvent such as water inside the pail, the suction generating apparatus having a suction hose, and said airborne dust abatement device comprising:

a mounting structure with a surface that selectively engages and facilitates securement of said abatement device to one of either the pail sidewall and the open upper pail end;

a radial manifold forming a radically disbursed air intake and an enclosed radial channel to pneumatically join said radially disbursed air intake with a discharge nozzle, an open manifold interior and a central manifold axis, said manifold being joined to said mounting structure, said mounting structure positioning said radial manifold around the open upper pail end with said central manifold axis being linearly aligned with the central pail axis, said radially disbursed air intake being located around said manifold at an air intake level, said radial manifold having a radial eave, said radial eave extending inwardly from said radially disbursed air intake toward said central manifold axis, said discharge nozzle being adapted to selectively connect to the suction hose to pneumatically join said radial channel to the suction generating apparatus, wherein the suction generating device is selectively operable to provide suction to said radial channel and said radially disbursed air intake to generate a radially uniform inward and upward airflow path with a lower boundary proximal said air intake level, and wherein the flow of powdery material flows through said airborne dust abatement device and into the pail interior, and said disbursed air intake draws in the airborne dust above said lower boundary when one of either pouring and mixing the powdery material.

27. The airborne dust abatement device of claim 26, and wherein said radially uniform inward and upward airflow path generates a dust shield zone extending from said lower boundary to a height of at least about one half foot above said abatement device, and the airborne dust entering or generated within said dust shield zone is one of either reliably drawn into said radially disbursed air intake and allowed to settle in the pail.

28. The airborne dust abatement device of claim 26, and wherein said mounting structure is a sleeve with a frusto-conical sidewall, said sidewall having an outer surface that engages said inside surface of the pail to secure said device to the pail and forms an air seal between said device and the pail.

29. The airborne dust abatement device of claim 28, and wherein said radial manifold has a lower manifold surface, and said mounting structure includes said lower manifold surface.

* * * * *